Figure 1:
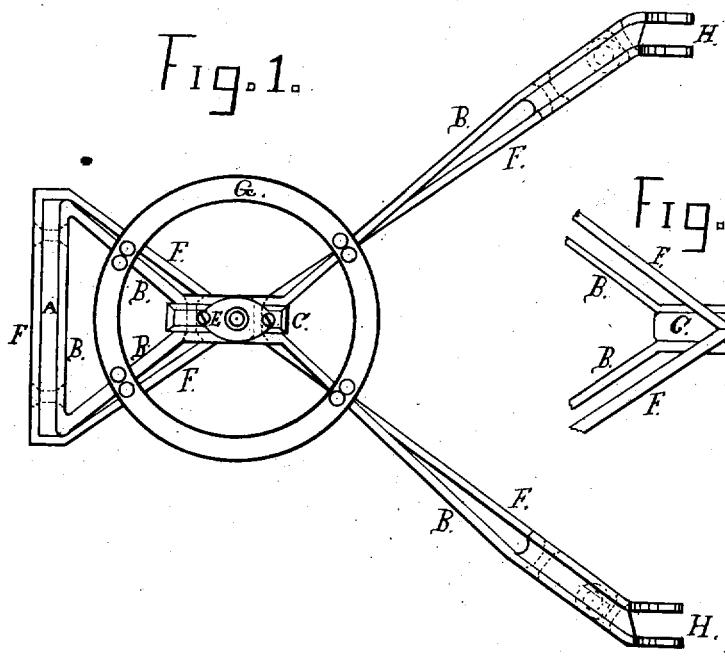

W. B. ROMIG,

Assignor, by mesne assignments, to LEHIGH MANUFACTURING CO.

Iron Platform for Wagons.

No. 9,624. Reissued March 29, 1881.

WITNESSES.

A. F. Fuller

Wm. N. Marcus.

INVENTOR.

W. B. Romig by John Shinn, Attorney.

N. PETERS, PHOTO-LITHOGRAPHER, WASHINGTON, D.C.

UNITED STATES PATENT OFFICE.

WILLIAM B. ROMIG, OF BETHLEHEM, PA., ASSIGNOR, BY MESNE ASSIGNMENTS, TO LEHIGH MANUFACTURING COMPANY, OF SAME PLACE.

IRON PLATFORM FOR WAGONS.

SPECIFICATION forming part of Reissued Letters Patent No. 9,624, dated March 29, 1881.

Original No. 206,042, dated July 16, 1878. Application for reissue filed February 21, 1881.

*To all whom it may concern:*

Be it known that I, WILLIAM B. ROMIG, a citizen of the United States, residing at Bethlehem, in the county of Northampton and State of Pennsylvania, formerly of Lehighton, in the county of Carbon and State of Pennsylvania, have invented a new and useful Improvement in Iron Platforms for Wagons, of which the following is a specification.

The object of this invention is to construct platforms for wagons so formed as to make them light in weight, yet strong, firm, and durable.

The invention consists, first, in the combination and arrangement of the supporting-bars, spring, and center blocks and socket-plate; second, in the combination and arrangement of the supporting-bars, fifth-wheel, and two bracing-bars, as will be hereinafter fully described, referring to the drawings making a part of this specification, in which—

Figure 3:
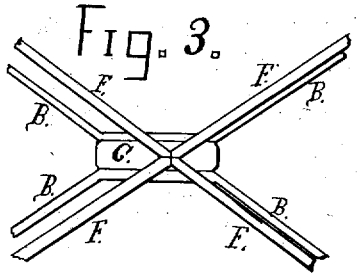
Figure 2:
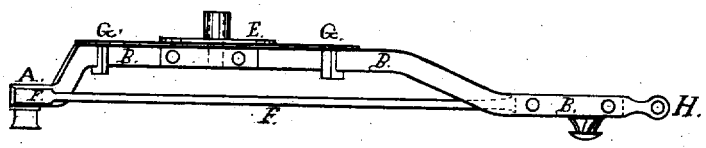

Figure 1 is a top view of my improved iron platform. Fig. 2 is a side view of the same. Fig. 3 is a detail under-side view of the middle part of the same.

Similar letters of reference indicate corresponding parts.

A represents the spring-block, which is made of wood, and of such shape and size as the kind or size of the spring to be attached to it may require.

To the forward side of the spring-block A is bolted or riveted the middle part of the bar B. The bar B, at the ends of the block A, is bent inward and upward and then horizontal until its parts nearly meet, and the said parts are then bolted or riveted to the opposite sides of a short wooden block, C. From the block C the parts of the bar B incline outward, are bent downward and then outward, and are bolted or riveted to the outer sides of the wooden blocks D D, that part of the bar B supporting the fifth-wheel being elevated or arched above the other parts, as shown in Fig. 2.

To the elevated and horizontal parts of the bar B is secured, by U-rivets or other suitable fastenings, the fifth-wheel G.

To the upper side of the wooden block C is bolted a plate, E, which is provided with a socket to receive the king-bolt.

To the rear side of the spring-block A is bolted or riveted the middle part of the bar or rod F, the parts of which, at the ends of the said spring-block A, are bent inward, and cross and are welded to each other below the king-bolt. From the point of crossing the parts of the rod F incline outward and are bolted or riveted to the inner sides of the wooden blocks D D.

Upon the forward ends of the bars B F are formed lugs H to receive the thill-irons of the shafts or pole.

To the lower sides of the blocks D D are attached fastenings for the springs.

The arching of the parts of the bar B that support the fifth-wheel G enables the platform to be made of any desired height. The bar B is preferably made of flat iron with the edge upward. The bar F may be made of flat, square, or round iron, as may be desired.

Having thus described my invention, I claim as new and desire to secure by Letters Patent—

1. In a wagon-platform, the combination of supporting-bar B, spring-block A, connecting-blocks C D D, socket-plate E, and fifth-wheel G, as shown, described, and for the purpose specified.

2. In a wagon-platform, the combination of supporting-bar B, fifth-wheel G, and a bracing-bar, F, passing under the fifth-wheel and connected at the four corners, as shown, described, and for the purpose set forth.

WM. B. ROMIG.

Witnesses:
LEWIS WEISS,
FRANCIS WEISS, Jr.